United States Patent
Hartmann

(10) Patent No.: US 7,930,933 B2
(45) Date of Patent: Apr. 26, 2011

(54) METHOD AND DEVICE FOR DIAGNOSING AT LEAST ONE GAS EXCHANGE VALVE OF AT LEAST ONE CYLINDER OF AN INTERNAL COMBUSTION ENGINE

(75) Inventor: Dirk Hartmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 12/332,946

(22) Filed: Dec. 11, 2008

(65) Prior Publication Data

US 2009/0199628 A1 Aug. 13, 2009

(30) Foreign Application Priority Data

Feb. 7, 2008 (DE) .................. 10 2008 008 208

(51) Int. Cl.
G01M 15/04 (2006.01)
(52) U.S. Cl. .................................................. 73/114.79
(58) Field of Classification Search ............... 73/114.36, 73/114.69, 114.74, 114.77, 114.79
See application file for complete search history.

(56) References Cited

U.S. PATENT DOCUMENTS

| 2004/0083049 A1 | 4/2004 | Fuchs |
| 2006/0151223 A1 | 7/2006 | Knoll |
| 2010/0106393 A1* | 4/2010 | Sgatti et al. .................. 701/111 |

FOREIGN PATENT DOCUMENTS

DE 10 2005 049 777 4/2007

* cited by examiner

*Primary Examiner* — Eric S McCall
(74) *Attorney, Agent, or Firm* — Kenyon & Kenyon LLP

(57) ABSTRACT

A method and a device for the diagnosis of at least one gas exchange valve of at least one cylinder of an internal combustion engine that is on the one hand reliable and on the other hand does without additional sensor equipment are described. In a first operating state of the internal combustion engine, at least one gas exchange valve of the at least one cylinder is activated. In a second operating state of the internal combustion engine, all the gas exchange valves of the at least one cylinder are deactivated and therewith closed in stationary fashion. Sound waves produced by the internal combustion engine are acquired. It is checked whether a significant change occurs in a quantity characterizing the acquired sound waves upon a transition from the first operating state to the second operating state. In this case, an erroneous opening of the at least one gas exchange valve is recognized.

8 Claims, 3 Drawing Sheets

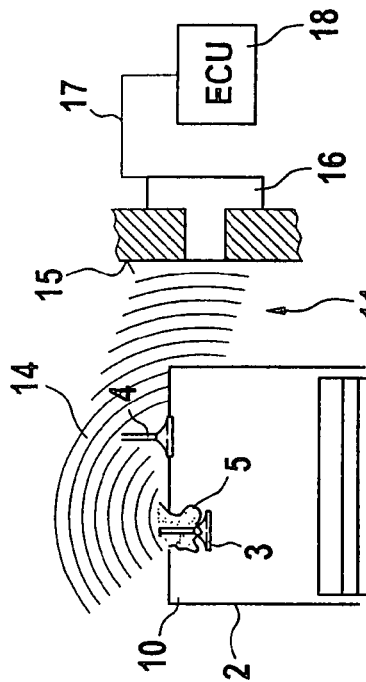
Fig. 1
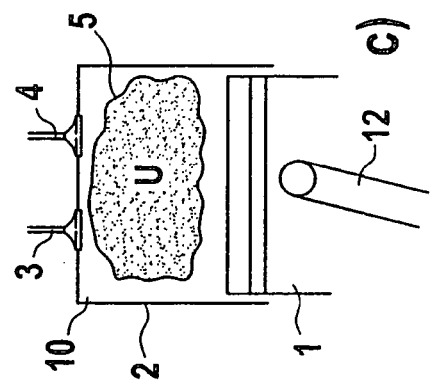
c)
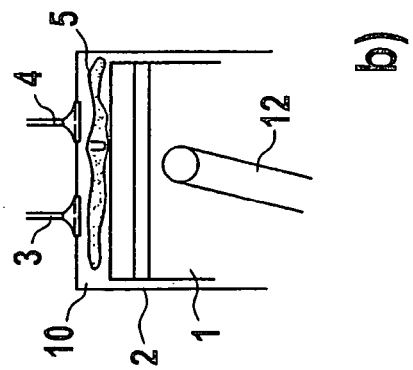
b)
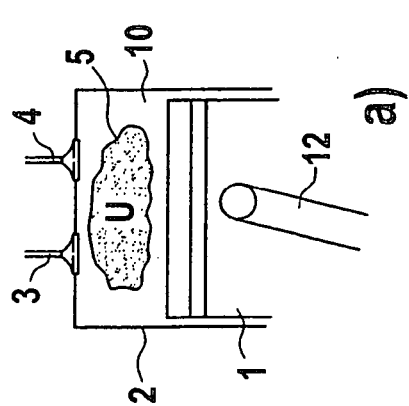
a)
Fig. 2
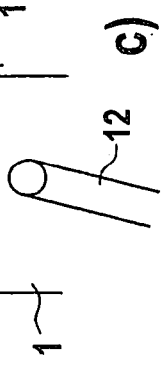
c)
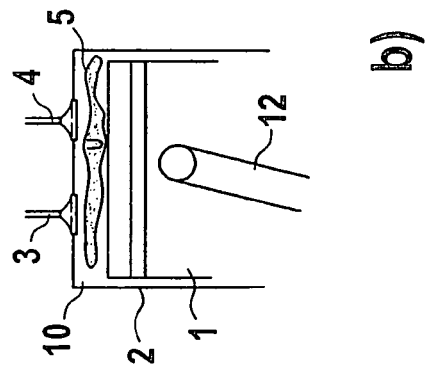
b)
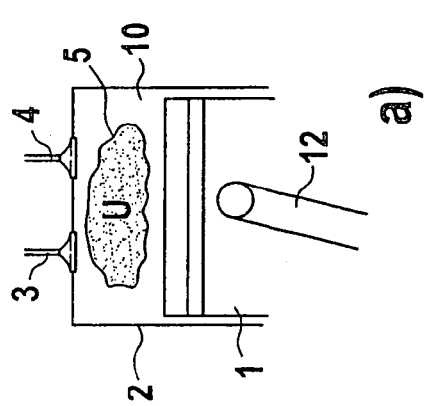
a)

METHOD AND DEVICE FOR DIAGNOSING AT LEAST ONE GAS EXCHANGE VALVE OF AT LEAST ONE CYLINDER OF AN INTERNAL COMBUSTION ENGINE

FIELD OF INVENTION

The present invention relates to a method and a device for diagnosing at least one gas exchange valve of at least one cylinder of an internal combustion engine.

BACKGROUND INFORMATION

German Patent Application No. DE 10 2005 049 777 A1 describes a method and a device for operating an internal combustion engine. Here, in at least one operating state of the internal combustion engine, at least one intake or exhaust valve of a cylinder of the internal combustion engine is switched off, or at least one switched-off intake or exhaust valve of the cylinder is reactivated. Thus, for example, a first operating state of the internal combustion engine can be provided by switching off half of the cylinders by switching off the intake or exhaust valves, as well as by switching off the fuel injection. This first operating state is also called half engine operation. In the case in which cylinders are switched off, in half engine operation, half the cylinders are switched off by switching off the intake and exhaust valves as well as the fuel injection. In a second operating state of the internal combustion engine, for example, all the cylinders are then reactivated, i.e., their intake and exhaust valves and the fuel injection are reactivated. This second operating state is also called full engine operation.

The time at which a deactivation or activation, i.e., a switching off or a switching back on, of an intake or exhaust valve (also called a gas exchange valve) can take place is limited by the basic circuit of the camshaft, because only then is the corresponding gas exchange valve closed, in the forceless idle state.

SUMMARY OF THE INVENTION

The method and the device according to the present invention for diagnosing at least one gas exchange valve of at least one cylinder of an internal combustion engine have an advantage that sound waves produced by the internal combustion engine are acquired and that it is checked whether, upon transition from the first operating state to the second operating state, a significant change occurs in a quantity that characterizes the acquired sound waves. In this case, an erroneous opening of the at least one gas exchange valve is recognized. This creates a simple and reliable means of diagnosing an erroneous opening of the at least one gas exchange valve, which in addition can be realized using already-present sensor equipment, thus avoiding the need for additional sensor equipment.

The diagnosis according to the present invention can be carried out in a particularly simple manner if an amplitude or an intensity of the acquired sound waves is evaluated as the quantity characterizing the acquired sound waves. These quantities can be determined without great expense, for example from the signal provided by a structure-borne sound sensor.

The diagnosis can then take place in a simple manner by comparing the amplitude or the intensity of the acquired sound waves to a prespecified threshold value, and recognizing the erroneous opening of the at least one gas exchange valve as a function of the result of the comparison, preferably if the prespecified threshold value is exceeded by the amplitude or the intensity of the acquired sound waves.

A particularly reliable diagnosis of an erroneous opening of the at least one gas exchange valve is achieved by evaluating at least one frequency, or a frequency spectrum, of the acquired sound waves as the quantity characterizing the acquired sound waves.

In this case, the diagnosis can easily be realized by checking whether the acquired sound waves have at least one prespecified frequency portion lying above a prespecified threshold, and by recognizing in this case an erroneous opening of the at least one gas exchange valve.

It is particularly advantageous if the sound waves are acquired by a structure-borne sound sensor. In this way the sound waves can be reliably acquired, and a structure-borne sound sensor is as a rule already present in modern internal combustion engines for other evaluative purposes, such as the recognition of misfires, so that the diagnosis according to the present invention does not require any additional sensor equipment.

The reliability of the diagnosis can be increased by recognizing the erroneous opening of the at least one gas exchange valve only if the significant change in the quantity characterizing the acquired sound waves takes place within a prespecified time from the activation, or request for activation, of the second operating state, starting from the first operating state.

BRIEF DESCRIPTION OF THE DRAWINGS

FIGS. 1a through 1c show the operation of a cylinder of an internal combustion engine given an intake valve closed in error-free fashion.

FIGS. 2a through 2c show the operation of the cylinder with the intake valve at first closed and subsequently opened in erroneous fashion, FIG. 2c also showing additional devices for receiving and evaluating sound waves produced by a cylinder.

DETAILED DESCRIPTION

Figure 3:
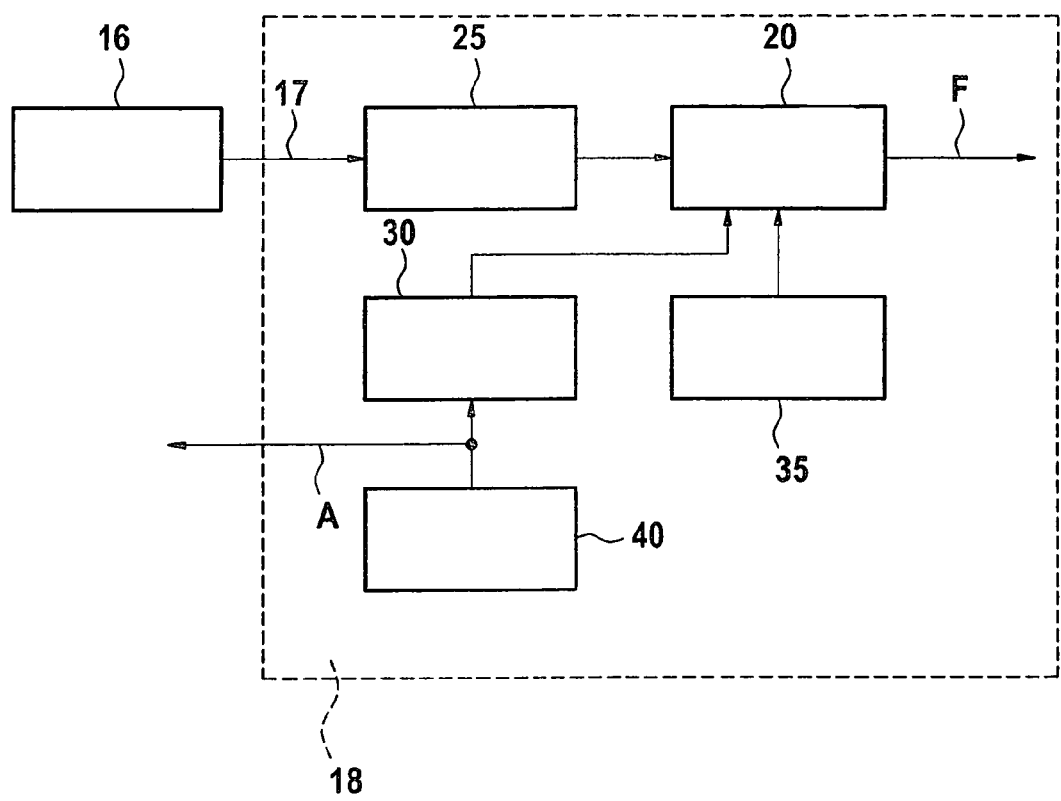
FIG. 3 shows a functional diagram of an exemplary device according to the present invention.

FIG. 1a schematically shows a longitudinal section through a cylinder 2 of an internal combustion engine. The internal combustion engine can be fashioned for example as a gasoline engine or as a diesel engine. Cylinder 2 includes a combustion chamber 10. Fresh air, possibly together with fuel, is capable of being supplied to combustion chamber 10 via at least one intake valve 3. The exhaust gas formed during the combustion of the air/fuel mixture in combustion chamber 10 can be carried out of combustion chamber 10 via at least one exhaust valve 4. The combustion of the air/fuel mixture in combustion chamber 10 causes a piston 1 of cylinder 2 to move up and down, thus driving, via a connecting rod 12, a crankshaft of the internal combustion engine (not shown in FIG. 1a for simplicity).

Cylinder 2 of the internal combustion engine can be operated in different operating states. In a first operating state of the internal combustion engine, the at least one intake valve 3 and the at least one exhaust valve 4 are activated. That means for example that in an intake stroke of cylinder 2 the at least one intake valve 3 is opened in order to suction in fresh air, and possibly fuel, and the at least one exhaust valve 4 is closed. Alternatively, the fuel may also be injected directly into combustion chamber 10. During a compression stroke of cylinder 2, the at least one intake valve 3 and the at least one exhaust valve 4 are then closed. The same also holds for a subsequent combustion stroke. In the subsequent exhaust stroke, the at least one intake valve 3 is then closed and the at least one exhaust valve 4 is then opened. This valve actuation represents only an example of an operation of cylinder 2 with activated intake and exhaust valves 3, 4. Such operation is characteristic for example of a four-stroke engine in full engine operation, in which all the cylinders of the internal combustion engine are operated in the described manner.

A second operating state of the internal combustion engine is characterized in that all the intake and exhaust valves 3, 4 of cylinder 2 are deactivated and are thus closed in stationary fashion. This means that during all previously described strokes of cylinder 2 in the second operating state all the intake and exhaust valves 3, 4 of cylinder 2 are closed. This is required for example in half engine operation of the internal combustion engine, in which only half the cylinders of the internal combustion engine are operated with activated intake and exhaust valves, while the other half of the cylinders are not operated; i.e., all the intake and exhaust valves of this cylinder are permanently closed during this operating state, and no supply of fuel takes place.

FIGS. 1a through 1c show the operation of cylinder 2 in the second operating state, all the intake and exhaust valves 3, 4 of cylinder 2 being closed at the beginning of and during this second operating state in stationary fashion, i.e. permanently. In FIG. 1a, piston 1 moves upward in cylinder 2. Due to the last combustion in the combustion chamber of cylinder 10 in the previous, first operating state of the internal combustion engine, the combusted exhaust gas 5 is compressed as internal energy U in combustion chamber 10 of cylinder 2 by the upward movement of piston 1, and is not ejected through closed intake and exhaust valves 3, 4.

FIG. 1b shows top dead center of piston 1 in cylinder 2, in which the combusted exhaust gas 5 is compressed to the smallest, minimal space. This results in pressures between, for example, 20 and 40 bar. Because intake and exhaust valves 3, 4 continue to be directly deactivated and are therefore closed, combusted exhaust gas 5 essentially cannot escape.

FIG. 1c shows the subsequent downward movement of piston 1 in cylinder 2. This movement causes compressed exhaust gas 5 to relax, and internal energy U of the combusted exhaust gas is used to move piston 1 downward. Here, intake and exhaust valves 4 of cylinder 2 continue to be deactivated and therefore closed, because the second operating state continues to obtain. Thus, internal energy U of the combusted exhaust gas in combustion chamber 10 realizes a gas spring that causes piston 1 to execute upward and downward movement. The movement of piston 1 downward according to FIG. 1c takes place due to the recovery of energy from the gas spring that is compressed at top dead center of piston 1 according to FIG. 1b.

FIGS. 2a through 2c show the case in which, in the second operating state, the at least one intake valve 3 opens in erroneous fashion. First, and at the beginning of the second operating state of the internal combustion engine, intake and exhaust valves 3, 4 are completely closed, because (according to FIG. 2a, which corresponds to FIG. 1a) piston 1 moves upward so that the cylinder is in the compression stroke. Here, the at least one intake valve 3 and the at least one exhaust valve 4 are closed if in FIG. 2b, which corresponds to FIG. 1b, piston 1 has reached its top dead center and the combusted exhaust gas 5 is maximally compressed.

If, in the subsequent compression stroke according to FIG. 2c, in which piston 1 moves downward again, the at least one intake valve 3 and/or the at least one exhaust valve 4 open in erroneous fashion as a result of a defect, combusted exhaust gas 5 escapes, so that internal energy U escapes from combustion chamber 10 abruptly, via the incorrectly opened valve or valves. The defect can be a mechanical defect of the camshaft that drives the at least one intake valve 3 or the at least one exhaust valve 4. In the case of an electromagnetic or electrohydraulic valve controller, the defect can also be a defect of this electromagnetic or electrohydraulic valve controller that incorrectly opens the at least one intake valve 3 and/or the at least one exhaust valve 4.

Internal energy U or combusted exhaust gas 5 escapes from combustion chamber 10 in a manner similar to a detonation, and produces sound waves, for example in the form of structures borne sound waves. Acoustically, this escape can clearly be heard as mechanical noise, comparable to the impact of a hammer against the engine block. The sound waves are identified in FIG. 2c by reference character 14, and are transmitted via engine compartment 11 and engine block 15, in which there is situated a sensor 16, for example a structure-borne sound sensor, that picks up these sound waves 14. Structure-borne sound sensor 16 is connected to a control device 18 via an information line 17. Control device 18 receives the data via the sound waves 14 from structure-borne sound sensor 16, and evaluates them. If sound waves 14 occur directly after, or within a prespecified time after, the activation of the second operating state, the erroneous opening of the at least one intake valve 3 and/or of the at least one exhaust valve 4 is recognized.

The high internal energy U can be produced only during the activation of the second operating state, i.e. immediately after the end of the previous, first operating state. After sound waves 14 have been produced by the escape of internal energy U from combustion chamber 10, almost no energy is left in cylinder 2. After 720° of crankshaft angler the case shown in FIG. 2c is repeated mechanically, but a high internal energy no longer escapes. Thus, the probability of the production of a sound wave, as a function inter alia of the geometry of the piston compartment, is lower. The described diagnostic possibility is therefore possible only directly after the activation of the second operating state, i.e. only during the first 720° of crankshaft angle after the activation or changeover from the first operating state to the second operating state, for the case under consideration here of a four-stroke engine.

FIG. 3 shows a functional diagram of an exemplary device according to the present invention for diagnosing the at least one intake valve 3 and/or the at least one exhaust valve 4 of the at least one cylinder 2 of the internal combustion engine, which can be implemented for example in terms of software and/or in terms of hardware in engine control unit 18. For simplicity, therefore, in the following the device for diagnosis will be regarded as equivalent to control device 18. However, in general control device 18 is the engine control device, which also performs functions other than the diagnosis according to the present invention.

Device 18 includes an evaluation unit 25 to which the signal from structure-borne sound sensor 16 is supplied via information line 17. Evaluation unit 25 evaluates the signal from structure-borne sound sensor 16, which signal provides an image of sound waves 14 received by structure-borne sound sensor 16, with regard to one or more quantities that characterize acquired sound waves 14. These quantities can be for example an amplitude of the sound waves, or the sound pressure level of the sound waves, a sound intensity, or a sound power. This quantity or quantities are each compared, in a comparator unit 20, with a prespecified threshold value obtained from a threshold value storage unit 35.

If the quantity from structure-borne sound sensor 16 evaluated by evaluation unit 25 exceeds the allocated prespecified threshold value from threshold value storage device 35, or, in the case of the evaluation of a plurality of different quantities, all these quantities exceed their respectively allocated threshold value, comparator unit 20 outputs a set signal at its output as an error signal, indicating the recognition of an erroneous opening of the at least one intake valve 3 and/or of the at least one exhaust valve 4. Otherwise, i.e. if the quantity represented by the signal from structures borne sound sensor 16 evaluated by evaluation unit 25 does not exceed the allocated prespecified threshold value, or, in the case of a plurality of quantities of the signal of structure-borne sound sensor 16 evaluated by evaluation unit 25, at least one of the evaluated quantities does not exceed its allocated prespecified threshold value, error signal F is not set, so that no error is recognized.

In the case of a recognized error, this error can for example be displayed on a display unit. As an error reaction measure, emergency operation of the internal combustion engine may also be introduced, with reduced power or, as a final consequence, shutting off of the internal combustion engine.

In addition, a time element 30 is provided in device 18 to which a signal is supplied from a request unit 40. Request unit 40 determines, as a function of the current operating point of the internal combustion engine, whether the first operating state or the second operating state should be set, i.e., for example, whether full engine operation or half engine operation should be set. If, starting from the first operating state, request unit 40 determines that the second operating state should be set, it forms a corresponding request signal with which, for example in the case of an electromagnetic or an electrohydraulic valve controlling, all the intake and exhaust valves of the cylinders that are to be switched off for the second operating state are to be deactivated and thus rendered stationary or permanently closed. In FIG. 3, this signal is identified by reference character A, and is also supplied to time element 30. Upon the receipt of the request signal for the changeover from the first operating state to the second operating state, time element 30 is started, and outputs, beginning from the reception of request signal A until the expiration of a prespecified time (corresponding for example to a crank angle interval of 720° in addition to the required reaction time from the generation of request signal A until the deactivation of the named intake and exhaust valves), a release signal to comparator unit 20, and otherwise outputs a blocking signal. As long as comparator unit 20 receives the release signal, it carries out the described comparison and the corresponding formation of error signal F; otherwise it outputs as error signal F a signal that has been reset. In order to determine the prespecified time corresponding to the crank angle of 720°, time element 30 is also to be provided with the current rotational speed of the internal combustion engine; however, for reasons of clarity this is not shown in FIG. 3, and is in any case known to those skilled in the art.

In addition to, or alternatively to, the named quantities evaluated by evaluation unit 25 from the signal of structure-borne sound sensor 16, evaluation unit 25 can also evaluate at least one frequency, or a frequency spectrum, of the sound waves 14 acquired by structure-borne sound sensor 16 from the received signal from structure-borne sound sensor 16. This can be performed with the aid of a frequency analysis in evaluation unit 25, for example using a fast Fourier transformation FFT. The at least one determined frequency, or frequency spectrum, from acquired sound waves 14 is then forwarded by evaluation unit 25 to comparator unit 20. Comparator unit 20 then checks whether the at least one frequency corresponds to a prespecified frequency from threshold value storage device 35, and whether this frequency portion is situated above a threshold that is also stored in threshold value storage device 35. In this case, an erroneous opening is also recognized of the at least one intake valve 3 and/or of the at least one exhaust valve 4, and error signal F is set. The prespecified frequency, or plurality of prespecified frequencies, with which the at least one frequency, determined by evaluation unit 25, of the signal of structure-borne sound sensor 16 is compared can be determined for example on a test bench as characteristic for the escape of combusted exhaust gas 5 from combustion chamber 10, caused for example by the erroneous opening of the at least one intake valve 3 and/or the erroneous opening of the at least one exhaust valve 4. The same holds correspondingly for the determination of the prespecified threshold value that must be exceeded by the at least one frequency portion, determined by evaluation unit 25, of the signal of structure-borne sound sensor 16 in order to recognize an erroneous opening of the at least one intake valve 3 and/or an erroneous opening of the at least one exhaust valve 4 as the cause of error.

In general, evaluation unit 25 can determine the frequency spectrum of the signal of structure-borne sound sensor 16 in the described manner, and comparator unit 20 then checks, on the basis of the frequency spectrum of the signal of structure-borne sound sensor 16 received by evaluation unit 25, whether this frequency spectrum has at least one prespecified frequency portion having a magnitude that is greater than a prespecified threshold, in which case error signal F is set. The prespecified frequency portion and the prespecified threshold can be determined in the same way as the previously described frequency and its threshold value, for example on a test bench. Here it can also be provided that for the error recognition it is checked in comparator unit 20 whether the frequency spectrum has not just one but rather a plurality of frequency portions of sound waves 14 that are characteristic for the erroneous opening of the at least one intake valve 3 and/or of the at least one exhaust valve 4 and that are greater than a threshold value that is allocated to the respective frequency portion and that is likewise characteristic for the erroneous opening of the at least one intake valve 3 and/or of the at least one exhaust valve 4; these frequency portions and their allocated threshold values can also be applied in the described manner, for example on a test bench.

In the evaluation of the previously described amplitudes of the acquired sound waves, or the sound pressure level, sound intensity, or sound power thereof, the respectively allocated threshold value that is to be exceeded in order for an error to be recognized can also be applied for example on a test bench in such a way that its exceeding is characteristic for the exit of combusted exhaust gas 5 from combustion chamber 10 due to the erroneous opening of the at least one intake valve 3 and/or due to the erroneous opening of the at least one exhaust valve 4, but that this exceeding cannot take place in the absence of such an error.

Figure 4:
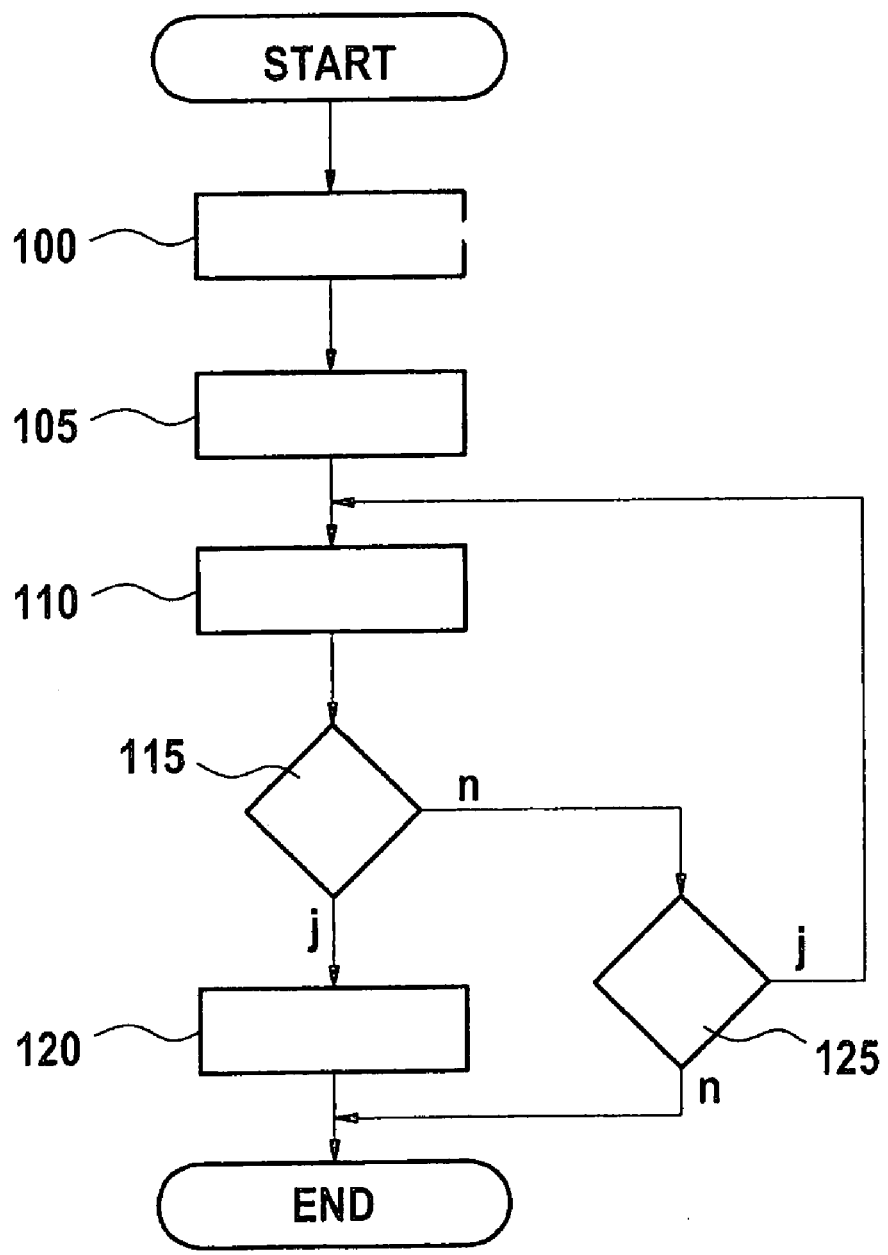
FIG. 4 shows a sequence diagram of an exemplary method according to the present invention.

Finally, FIG. 4 shows a sequence diagram for an exemplary method according to the present invention. After the start of the program, at program point 100 request unit 40 produces a changeover request for the activation of the second operating state, beginning from the first operating state, by generating request signal A. Branching then takes place to a program point 105.

At program point 105, time element 30 is started. Branching then takes place to a program point 110.

At program point 110, evaluation unit 25 evaluates the signal of structure-borne sound sensor 16 with respect to one or more of the named quantities. Branching then takes place to a program point 115.

At program point 115, comparator unit 20 checks whether the evaluated quantity exceeds its allocated threshold value, or, in the case of a plurality of evaluated quantities, whether all the quantities each exceed their respectively allocated threshold value; in the case of frequency evaluation at program point 115 it is checked whether the frequency or frequency spectrum determined by evaluation unit 25 contains the prespecified frequency portion or portions each greater than the prespecified threshold value allocated to them. If this is the case, branching takes place to a program point 120; otherwise, branching takes place to a program point 125.

At program point 120, error signal F is set. Subsequently the program is exited.

At program point 125, comparator unit 20 checks whether it is still receiving the release signal from time element 30. If this is the case, branching takes place back to program point 110; otherwise, the program is exited.

The abrupt escape of combusted exhaust gas 5 from combustion chamber 10 in the case of an incorrectly opened intake valve 3 and/or an incorrectly opened exhaust valve 4 produces sound waves 14 in the described manner, and these sound waves are superposed on the sound waves produced during operation up to that point of the internal combustion engine, so that the resulting sound waves received by structure-borne sound sensor 16 are subject to a significant alteration with respect to the quantity or quantities evaluated by evaluation unit 25, due to the sound waves 14 formed by the exhaust gas 5 escaping in abrupt fashion from combustion chamber 10, and this alteration is acquired in the described manner with the aid of the prespecified frequency or frequency portions or the prespecified threshold values in threshold value storage device 35, and is used for the recognition of the erroneous opening of the at least one intake valve 3 and/or of the at least one exhaust valve 4.

If the operation of all exhaust valves of cylinder 2 is known to be error-free, the set error signal F can be allocated unambiguously to an erroneous opening of the at least one intake valve 3. If the operation of all intake valves of cylinder 2 is known to be error-free, the set error signal F can be allocated unambiguously to an erroneous opening of the at least one exhaust valve 4.

For the evaluation, the sound waves received by structure-borne sound sensor 16 may be allocated temporally to the opening, expected to be erroneous, of the at least one intake valve 3 and/or of the at least one exhaust valve 4. Upon activation of the second operating state, beginning from the first operating state, the at least one intake valve 3 and/or the at least one exhaust valve 4 open in erroneous fashion at a predictable crank angle or at a predictable time. The sound waves that are thereby produced propagate, and are expected by structure-borne sound sensor 16 in the case of error. This temporal allocation also permits identification of the cylinder or cylinders that have the at least one incorrectly opening intake valve 3 and/or at least one incorrectly opening exhaust valve 4. This is because, due to the ignition sequence known in engine control unit 18 for the individual cylinders, erroneous opening of an intake and/or an exhaust valve is expected at different times or crank angles.

Due to the temporal allocation, the sound waves received by structure-borne sound sensor 16 can also be distinguished with regard to whether they are caused by the erroneous opening of an intake valve or exhaust valve, or due to other causes, such as for example knocking combustion.

What is claimed is:

1. A method for diagnosing at least one gas exchange valve of at least one cylinder of an internal combustion engine, the method comprising:

activating the at least one gas exchange valve of the at least one cylinder in a first operating state of the internal combustion engine;

deactivating and closing in stationary fashion all gas exchange valves of the at least one cylinder in a second operating state of the internal combustion engine;

acquiring sound waves produced by the internal combustion engine;

checking whether, upon a transition from the first operating state to the second operating state, there occurs a significant change in a quantity that characterizes the acquired sound waves; and recognizing an erroneous opening of the at least one gas exchange valve if the significant change in the quantity has occurred.

2. The method according to claim 1, further comprising:
evaluating an amplitude or an intensity of the acquired sound waves as the quantity characterizing the acquired sound waves.

3. The method according to claim 2, further comprising:
comparing the amplitude or the intensity of the acquired sound waves to a prespecified threshold value; and
recognizing the erroneous opening of the at least one gas exchange valve as a function of a result of the comparison, preferably upon an exceeding of the prespecified threshold value by the amplitude or intensity of the acquired sound waves.

4. The method according to claim 1, further comprising:
evaluating at least one frequency or a frequency spectrum of the acquired sound waves as the quantity characterizing the acquired sound waves.

5. The method according to claim 4, further comprising:
checking whether the acquired sound waves have at least a prespecified frequency portion situated above a prespecified threshold; and
recognizing the erroneous opening of the at least one gas exchange valve if the prespecified frequency portion is situated above the prespecified threshold.

6. The method according to claim 1, further comprising:
acquiring the sound waves by a structure-borne sound sensor.

7. The method according to claim X, further comprising:
recognizing the erroneous opening of the at least one gas exchange valve only if the significant change in the quantity characterizing the acquired sound waves occurs within a prespecified time from an activation, or from a request for activation, of the second operating state, beginning from the first operating state.

8. A device for diagnosing at least one gas exchange valve of at least one cylinder of an internal combustion engine, the at least one gas exchange valve of the at least one cylinder configured to be activated in a first operating state of the internal combustion engine, and all gas exchange valves of the at least one cylinder configured to be deactivated and closed in stationary fashion in a second operating state of the internal combustion engine, the device comprising:

means for testing whether acquired sound waves produced by the internal combustion engine show a significant change in a quantity characterizing the acquired sound waves upon a transition from the first operating state to the second operating state, and for recognizing an erroneous opening of the at least one gas exchange valve if the significant change in the quantity has occurred.

* * * * *